(12) United States Patent
Matsuda et al.

(10) Patent No.: US 10,746,267 B2
(45) Date of Patent: Aug. 18, 2020

(54) TOROIDAL CONTINUOUSLY VARIABLE TRANSMISSION

(71) Applicants: KAWASAKI JUKOGYO KABUSHIKI KAISHA, Kobe-shi, Hyogo (JP); NSK LTD., Tokyo (JP)

(72) Inventors: Kippei Matsuda, Kobe (JP); Hideyuki Imai, Akashi (JP); Kenichiro Tanaka, Kobe (JP); Kenji Komatsu, Kobe (JP); Eiji Inoue, Fujisawa (JP); Tomohiro Inoue, Fujisawa (JP); Daiki Shirota, Fujisawa (JP); Masahiro Kita, Fujisawa (JP)

(73) Assignees: KAWASAKI JUKOGYO KABUSHIKI KAISHA, Hyogo (JP); NSK LTD., Tokyo (JP)

( * ) Notice: Subject to any disclaimer, the term of this patent is extended or adjusted under 35 U.S.C. 154(b) by 0 days.

(21) Appl. No.: 16/345,055

(22) PCT Filed: Oct. 24, 2017

(86) PCT No.: PCT/JP2017/038242
§ 371 (c)(1),
(2) Date: Apr. 25, 2019

(87) PCT Pub. No.: WO2018/079506
PCT Pub. Date: May 3, 2018

(65) Prior Publication Data
US 2019/0277375 A1 Sep. 12, 2019

(30) Foreign Application Priority Data
Oct. 27, 2016 (JP) .................... 2016-210205

(51) Int. Cl.
*F16H 15/38* (2006.01)

(52) U.S. Cl.
CPC .................... *F16H 15/38* (2013.01)

(58) Field of Classification Search
CPC ............ F16H 15/38; F16H 15/34; F16H 15/36
See application file for complete search history.

(56) References Cited

U.S. PATENT DOCUMENTS

| 5,027,668 A * | 7/1991 | Nakano | .................. F16H 15/38 |
| | | | 184/6.12 |
| 5,540,631 A * | 7/1996 | Lohr, III | ................ F16H 15/38 |
| | | | 476/10 |

(Continued)

FOREIGN PATENT DOCUMENTS

| JP | 62-100334 U | 6/1987 |
| JP | 07-127699 A | 5/1995 |
| JP | 2000-213611 A | 8/2000 |

*Primary Examiner* — David M Fenstermacher
(74) *Attorney, Agent, or Firm* — Sughrue Mion, PLLC

(57) ABSTRACT

A toroidal continuously variable transmission includes a preload spring disposed between a rotary assembly including a first disc and a pressing device, and a driving force transmission shaft, and a thrust bearing disposed between a first member and the preload spring, the first member being one of the rotary assembly and the driving force transmission shaft. In a direction of an axis line, a gap is formed between a second member and the thrust bearing, the second member being the other of the rotary assembly and the driving force transmission shaft. A dimension of the gap in the direction of the axis line is less than a deformation amount of the preload spring in the direction of the axis line, at an elastic limit.

8 Claims, 4 Drawing Sheets

(56) References Cited

U.S. PATENT DOCUMENTS

| | | | | |
|---|---|---|---|---|
| 5,599,252 | A | | 2/1997 | Fukushima |
| 5,984,826 | A | * | 11/1999 | Nakano ................... F16H 15/38 476/45 |
| 6,162,144 | A | * | 12/2000 | Haka ....................... F16H 15/38 475/216 |
| 2003/0078133 | A1 | * | 4/2003 | Kobayashi .............. F16H 15/38 476/40 |
| 2019/0234496 | A1 | * | 8/2019 | Nishimura .............. F16C 25/08 |
| 2019/0277374 | A1 | * | 9/2019 | Matsuda ................. F16H 15/38 |
| 2019/0277375 | A1 | * | 9/2019 | Matsuda ................. F16H 15/38 |

* cited by examiner

TOROIDAL CONTINUOUSLY VARIABLE TRANSMISSION

CROSS REFERENCE TO RELATED APPLICATIONS

This application is a National Stage of International Application No. PCT/JP2017/038242 filed Oct. 24, 2017, claiming priority based on Japanese Patent Application No. 2016-210205 filed Oct. 27, 2016.

TECHNICAL FIELD

The present invention relates to a toroidal continuously variable transmission (toroidal CVT).

BACKGROUND ART

In a known toroidal continuously variable transmission (toroidal CVT), tiltable power rollers are disposed between an input disc and an output disc, a preload disc spring applies a pressure to the input disc, and a loading cam type pressing device applies a pressing force corresponding to transmitted torque to the input disc, as a biasing force for pressing (pushing) the input disc toward the output disc (see Patent Literature 1). In the toroidal CVT disclosed in Patent Literature 1, a first thrust bearing is disposed with an allowance at a location close to the inner diameter of the preload disc spring, and a second thrust bearing is disposed between the preload disc spring and the input disc, in a placement space of the preload disc spring. In accordance with this configuration, in a case where the pressing force applied by the pressing device becomes excess due to an increase in the transmitted torque, and the preload disc spring is about to be excessively compressed, the first thrust bearing serves as a stopper. This makes it possible to prevent permanent deformation or the like of the preload disc spring.

CITATION LIST

Patent Literature

Patent Literature 1: Japanese Laid-Open Patent Application Publication No. 2000-213611

SUMMARY OF INVENTION

Technical Problem

In the configuration disclosed in Patent Literature 1, two thrust bearings are arranged in a radial direction in the placement space of the preload disc spring. Therefore, the number of members is increased. During low torque, the first thrust bearing has the allowance. For this reason, the first thrust bearing collides with its adjacent member repeatedly, and the life of the first thrust bearing is reduced.

In view of the above, an object of the present invention is to reduce the number of members and extend the life of a thrust bearing while preventing permanent deformation or the like of a preload spring, in a toroidal continuously variable transmission (toroidal CVT).

Solution to Problem

According to an aspect of the present invention, a toroidal continuously variable transmission comprises: a driving force transmission shaft; a first disc disposed coaxially with the driving force transmission shaft; a rotary assembly including a second disc facing the first disc, and a pressing device which presses the second disc toward the first disc, the rotary assembly being disposed coaxially with the driving force transmission shaft; a power roller which is tiltably disposed between the first disc and the second disc; a preload spring disposed between the pressing device and the driving force transmission shaft, the preload spring being configured to apply a preload to the rotary assembly in a direction of an axis line of the driving force transmission shaft so that the rotary assembly is pressed (pushed) toward the first disc; and a thrust bearing disposed between a first member and the preload spring, the first member being one of the rotary assembly and the driving force transmission shaft, wherein in the direction of the axis line, a gap is formed between a second member and the thrust bearing, the second member being the other of the rotary assembly and the driving force transmission shaft, and wherein a dimension of the gap in the direction of the axis line is less than a deformation amount of the preload spring in the direction of the axis line, at an elastic limit.

In accordance with this configuration, the thrust bearing disposed between the first member and the preload spring, the first member being one of the rotary assembly and the driving force transmission shaft, also serves as a stopper which limits the deformation of the preload spring within an elastic deformation range to prevent plastic deformation or the like of the preload spring. In a state in which the gap formed between the second member and the thrust bearing, the second member being the other of the rotary assembly and the driving force transmission shaft, is maintained, the thrust bearing is retained between the first member and the preload spring. Therefore, the thrust bearing is held without an allowance. This makes it possible to reduce the number of members and extend the life of the thrust bearing while preventing permanent deformation or the like of the preload spring. The "thrust bearing" is defined as all kinds of bearings which receive a thrust force. The thrust bearing may be a bearing which receives a radial force as well as the thrust force. For example, the thrust bearing may be a roller bearing.

The thrust bearing may include a spring contact portion which contacts the preload spring, and a stopper portion provided at a location that is deviated from the spring contact portion in a radial direction, the stopper portion facing the second member in the direction of the axis line, with the gap between the stopper portion and the second member.

In accordance with this configuration, it is sufficient that the size of the thrust bearing is increased in the radial direction to obtain desired effects. Therefore, the configuration can be simplified.

The stopper portion may be disposed radially outward of the spring contact portion.

In accordance with this configuration, the gap formed between the second member and the thrust bearing is located radially outward of the preload spring. Therefore, in a state in which the preload spring is mounted, the gap can be easily seen from outside. As a result, it becomes easier to manage the gap.

The thrust bearing may include rolling elements and an outer race supporting the rolling elements from an outer side. The outer race may include a ring portion supporting the rolling elements in the radial direction, the spring contact portion protruding radially inward from the ring portion, and the stopper portion protruding radially outward from the ring portion, at a location that is more distant from the preload spring than the spring contact portion in the direction of the axis line.

In accordance with this configuration, desired effects can be obtained with a simple configuration in which a projection is provided at a portion of the outer race.

The second disc may have a cam surface on a side opposite to the first disc, and the pressing device may be a pressing device of a loading cam type, including a cam plate having a cam surface facing the cam surface of the second disc, and a roller sandwiched between the cam surface of the second disc and the cam surface of the cam plate.

Advantageous Effects of Invention

In accordance with the present invention, it becomes possible to reduce the number of members and extend the life of a thrust bearing while preventing permanent deformation or the like of a preload spring, in a toroidal continuously variable transmission (toroidal CVT).

DESCRIPTION OF EMBODIMENTS

Hereinafter, the embodiments of the present invention will be described with reference to the drawings.

Embodiment 1

Figure 1:
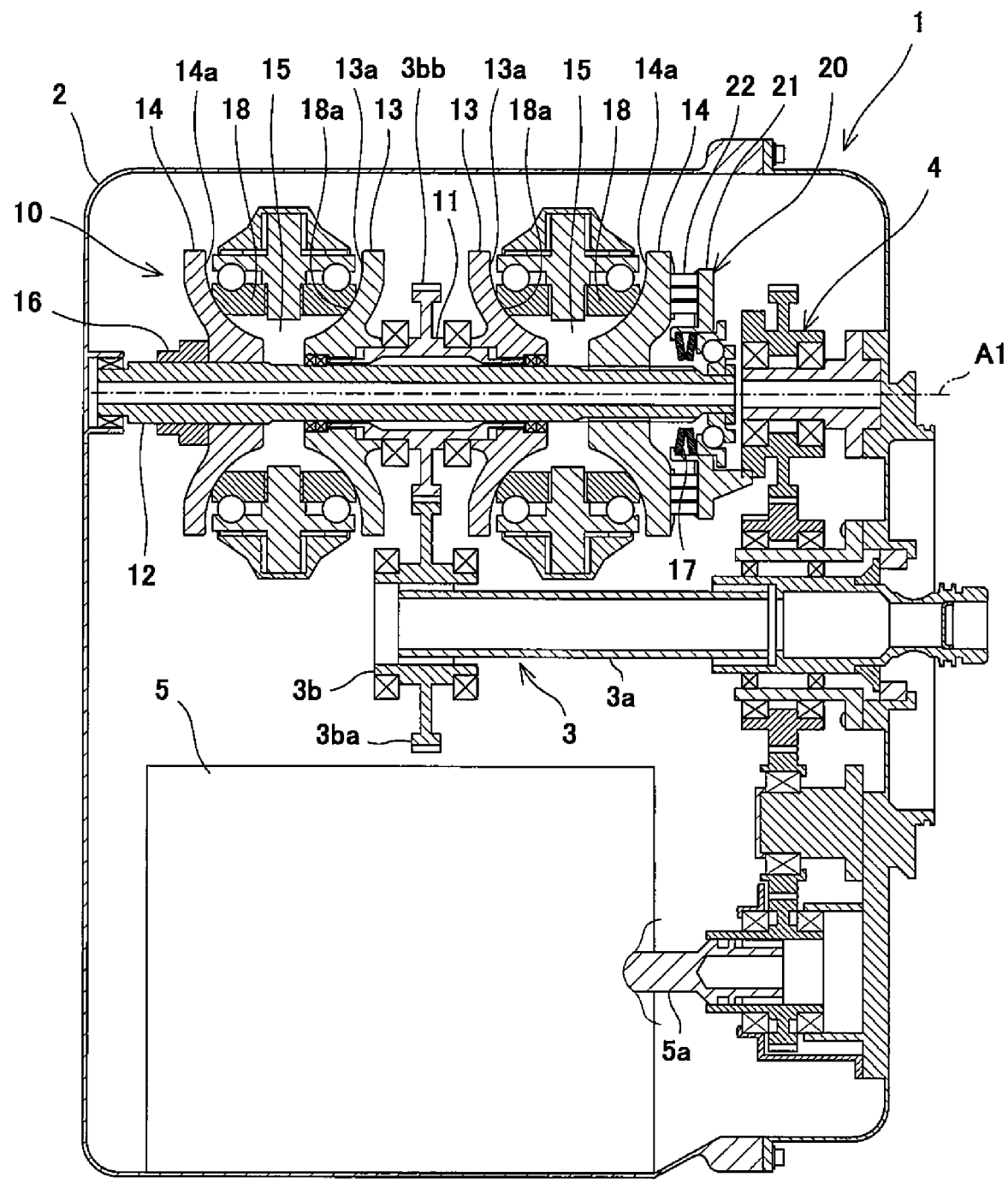
FIG. 1 is a cross-sectional view showing an integrated drive generator (IDG) including a toroidal continuously variable transmission (toroidal CVT) according to Embodiment 1.

FIG. 1 is a cross-sectional view showing an integrated drive generator 1 including a toroidal continuously variable transmission (toroidal CVT) 10 according to the embodiment. As shown in FIG. 1, the integrated drive generator 1 (hereinafter will be referred to as "IDG") is used in an AC power supply of an aircraft, and includes a casing 2 mounted on an engine of the aircraft. In the casing 2, an input mechanism 3, the toroidal CVT 10 (hereinafter will be referred to as "transmission"), a driving force transmission mechanism 4, and an electric power generator 5 are accommodated. Note that the toroidal CVT 10 is not limited to a part of the IDG, and its use is not limited to the aircraft.

The transmission 10 includes a transmission input shaft 11 and a transmission output shaft 12 which are placed coaxially and are relatively rotatable (hereinafter, the axis lines of the shafts 11 and 12 will be referred to as "rotational axis line A1"). The transmission input shaft 11 is connected to an engine rotary shaft (not shown) via the input mechanism 3. The input mechanism 3 includes a device input shaft 3a to which a rotational driving force taken out of the engine rotary shaft is input, and a pair of gears 3b which transmit the rotation of the device input shaft 3a to the transmission input shaft 11. The pair of gears 3b include a gear 3ba which is rotatable together with the device input shaft 3a, and a gear 3bb which is rotatable together with the transmission input shaft 11. The transmission output shaft 12 is connected to an electric power generator input shaft 5a of an electric power generator 5 via a driving force transmission mechanism 4 (e.g., gear train).

The rotational driving force taken out of the engine rotary shaft is input to the transmission input shaft 11 via the input mechanism 3. The transmission 10 changes the speed of the rotation of the transmission input shaft 11 and outputs the rotation to the transmission output shaft 12. The rotational driving force is transmitted from the transmission output shaft 12 to the electric power generator input shaft 5a via the driving force transmission mechanism 4. When the electric power generator input shaft 5a is driven to rotate, the electric power generator 5 generates AC power. A transmission ratio (transmission gear ratio) of the transmission 10 is continuously changed so that the rotation speed of the electric power generator input shaft 5a is kept at a proper value (value corresponding to a frequency which is suitable for the operations of electric components in the aircraft), irrespective of a change of the rotation speed of the engine rotary shaft.

The transmission 10 is, for example, a half toroidal and double cavity CVT. The transmission 10 includes two sets of input disc 13 (first disc) and output disc 14 (second disc). The input discs 13 are fitted to transmission input shaft 11 so that the input discs 13 are rotatable together with the transmission input shaft 11. The output discs 14 are fitted to the transmission output shaft 12 so that the output discs 14 are rotatable together with the transmission output shaft 12. The two sets of discs 13, 14 are disposed at locations that are adjacent to each other in the direction of the rotational axis line A1 so that the discs 13, 14 are rotatable around the rotational axis line A1. The input disc 13 and the output disc 14 are disposed to face each other in the direction of the rotational axis line A1 of the transmission 10. The input disc 13 and the output disc 14 have concave contact surfaces 13a, 14a, respectively, facing each other. The input disc 13 and the output disc 14 form an annular cavity 15 around the rotational axis line A1 by the contact surfaces 13a, 14a. Note that the transmission is not limited to a transmission with a double cavity configuration. The transmission may be, for example, a transmission with a single cavity configuration.

The transmission 10 has, for example, a center input configuration. The transmission output shaft 12 is inserted into the transmission input shaft 11 and protrudes from the both sides of the transmission input shaft 11. The two input discs 13 are disposed back-to-back on the transmission input shaft 11. The two output discs 14 are disposed outward of the two input discs 13 in the direction of the rotational axis line A1. The gear 3bb which is rotatable together with the transmission input shaft 11 is provided on the outer peripheral surface of the transmission input shaft 11. The gear 3bb is disposed between the two input discs 13. Note that the configuration of the transmission is not limited to the center input configuration, and may be, for example, a center output configuration. In the case of the center output configuration, a pressing device 20 which will be described later may be provided on the input disc 13 side.

The output disc 14 on a first side (one side) is fastened to the transmission output shaft 12 by a fastening member 16. The output disc 14 on a second side (the other side) is biased toward the input disc 13 by a preload spring 17 (e.g., disc spring). During the rotation, the output disc 14 on the second side is biased toward the input disc 13 by the pressing device 20. The pressing device 20 is a loading cam device. The output disc 14 is connected to the driving force transmission mechanism 4 via the pressing device 20. The transmission 10 includes a plurality of power rollers 18 disposed within the cavity 15 and a plurality of trunnions 19 (see FIG. 2) which support the plurality of power rollers 18, respectively so that the plurality of power rollers 18 are tiltable.

Figure 2:
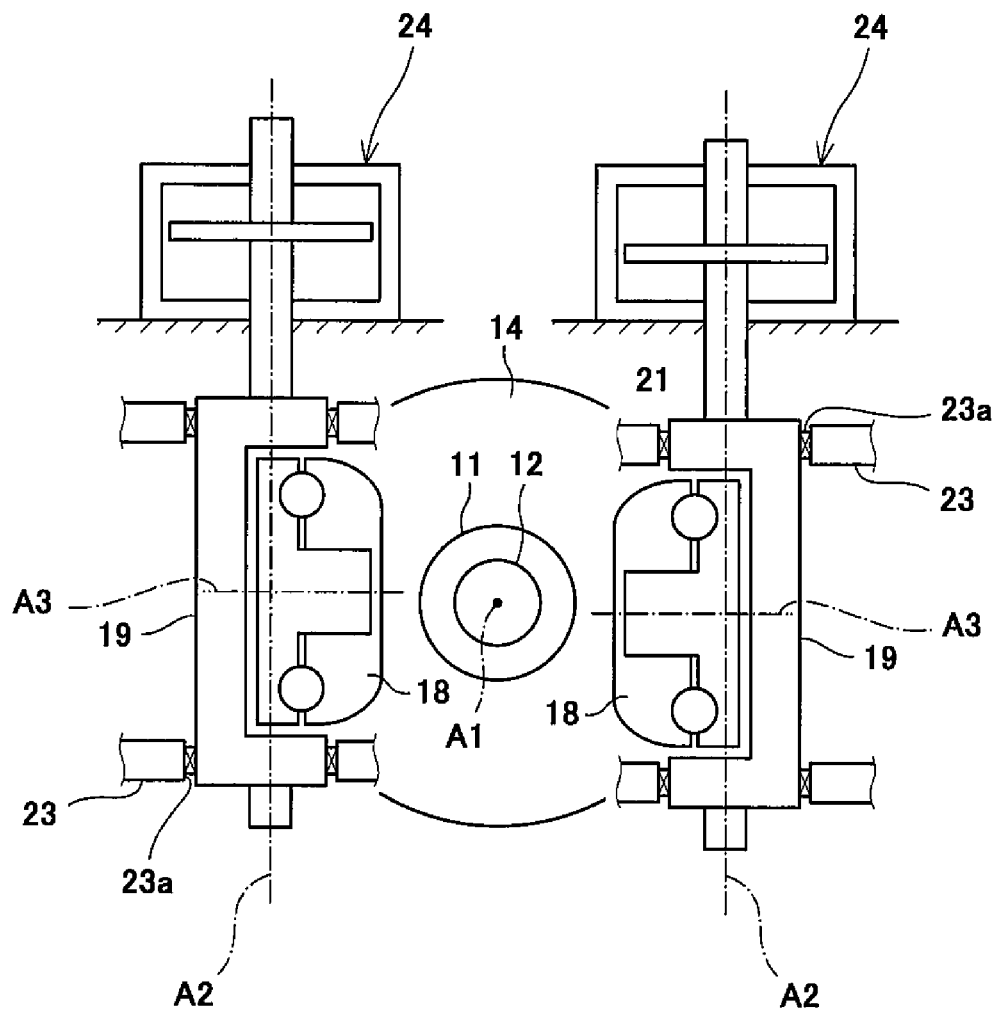
FIG. 2 is a cross-sectional view showing the toroidal CVT of FIG. 1, when viewed from a direction of a rotational axis line.

FIG. 2 is a cross-sectional view showing the transmission 10 of FIG. 1, when viewed from the direction of the rotational axis line A1. As shown in FIG. 2, the trunnions 19 are supported by the casing 2 so that each of the trunnions 19 is tiltable around a tilt motion axis line A2 and displaceable in the direction of the tilt motion axis line A2. The tilt motion axis line A2 is skew with respect to the rotational axis line A1. The power rollers 18 are supported by the trunnions 19, respectively so that each of the power rollers 18 is rotatable around a rotational axis line A3 perpendicular to the tilt motion axis line A2.

Each of the trunnions 19 is rotatably fitted into throughholes 23a of yokes 23 secured to the casing 2. The trunnions 19 are supported by the casing 2 via the yokes 23 so that each of the trunnions 19 is tiltable around the tilt motion axis line A2 and displaceable in the direction of the tilt motion axis line A2. The trunnions 19 are connected to hydraulic driving mechanisms 24, respectively. Each of the hydraulic driving mechanisms 24 is configured to reciprocatingly displace the trunnion 19 together with the power roller 18 in the direction of the tilt motion axis line A2.

As shown in FIGS. 1 and 2, when the input discs 13 are driven to rotate, the output discs 14 are driven to rotate via the power rollers 18, and the transmission output shaft 12 is driven to rotate. When the trunnions 19 and the power rollers 18 are displaced in the direction of the tilt motion axis line A2, angles (hereinafter will be referred to as "tilt motion angles") of the power rollers 18 around the tilt motion axis lines A2 are changed, and the transmission ratio (transmission gear ratio) of the transmission 10 is continuously changed based on the tilt motion angles.

The power rollers 18 are sandwiched between a contact surface 13a of the input disc 13 and a contact surface 14a of the output disc 14 in a state in which each of the power rollers 18 is tiltable around the tilt motion axis line A2. The power rollers 18 change the speed of the rotational driving force of the input disc 13 with the transmission ratio corresponding to the tilt motion angles, and transmit the rotational driving force to the output disc 14. When the rotation torque of the output disc 14 is increased, the pressing device 20 presses (pushes) the output disc 14 so that the output disc 14 approaches the input disc 13. Thus, a pressing force with which the power rollers 18 are sandwiched between the input disc 13 and the output disc 14 is increased.

Figure 3:
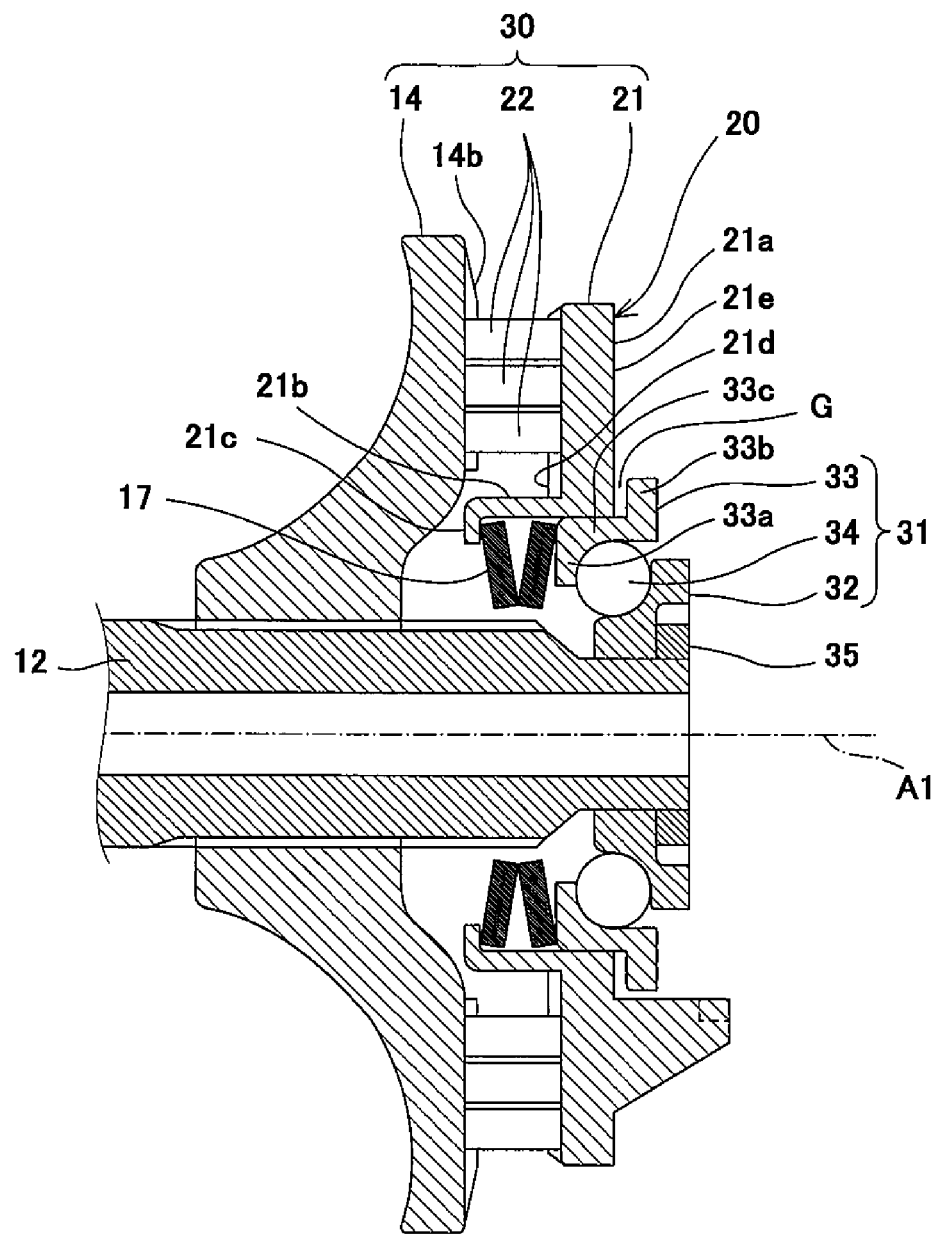
FIG. 3 is an enlarged view showing major components (constituents) of the toroidal CVT of FIG. 1.

FIG. 3 is an enlarged view showing major components (constituents) of the transmission 10 of FIG. 1. As shown in FIG. 3, the output disc 14 has a cam surface 14b on a side opposite to the input disc 13. The pressing device 20 is rotatably placed coaxially with the output disc 14. The pressing device 20 includes a cam plate 21 having a cam surface 21d facing the cam surface 14b of the output disc 14, and a plurality of rollers 22 sandwiched between the output disc 14 and the cam plate 21 and arranged in a radial direction perpendicular (orthogonal) to the rotational axis line A1.

The cam surface 14b of the output disc 14 and the cam surface 21d of the cam plate 21, facing each other, are formed with smooth concave and convex portions in the circumferential direction. The rollers 22 are sandwiched between the cam surfaces 14b, 21d in the direction of the rotational axis line A1 and the circumferential direction around the rotational axis line A1. When rotation torque of the output disc 14 and the cam plate 21 is increased, the output disc 14 is pressed to become away from the cam plate 21 by a cam action. In the present embodiment, an assembly including the output disc 14 and the pressing device 20 will be referred to as a rotary assembly 30.

The cam plate 21 includes an annular plate portion 21a having the cam surface 21d, a tubular portion 21b extending from the radially inner end portion of the annular plate portion 21a, toward the output disc 14 along the rotational axis line A1, and a flange portion 21c protruding radially inward from the tubular portion 21b. In the present embodiment, the flange portion 21c is provided at an end portion of the tubular portion 21b, the end portion being closer to the output disc 14. However, the flange portion 21c need not be provided at the end portion of the tubular portion 21b. The flange portion 21c may be provided at the tubular portion 21b at a location that is in the vicinity of a center of the tubular portion 21b in the direction of the rotational axis line A1. Further, the tubular portion 21b may be omitted. In this case, the flange portion 21c is provided at a radially inner portion of the annular plate portion 21a.

A thrust bearing 31 is externally fitted to the end portion of the transmission output shaft 12. The thrust bearing 31 is disposed between the transmission output shaft 12 and the preload spring 17 which will be described later. The thrust bearing 31 includes an inner race 32, an outer race 33, and rolling elements 34 disposed between the inner race 32 and the outer race 33. The inner race 32 is fitted to the transmission output shaft 12 so that movement of the inner race 32 to an outward side in the direction of the rotational axis line A1 with respect to the transmission output shaft 12 is restricted. For example, the inner race 32 is positioned with respect to the rotational axis line A1 by a nut 35 secured to the end portion of the transmission output shaft 12 and forming a portion of a driving force transmission shaft. Alternatively, the inner race 32 may be integrated with the transmission output shaft 12. The outer race 33 of the thrust bearing 31 at least partially overlaps with the cam plate 21, in the direction of the rotational axis line A1. In this way, a configuration which is compact in the direction of the rotational axis line A1 is realized.

The preload spring 17 is disposed between the pressing device 20 and the transmission output shaft 12. The preload spring 17 applies a preload to the rotary assembly 30 (specifically, the cam plate 21) in the direction of the rotational axis line A1 so that the rotary assembly 30 is pressed (pushed) toward the input disc 13. In the present embodiment, the preload spring 17 is disposed between the cam plate 21 and the thrust bearing 31. More specifically, the preload spring 17 is sandwiched between the flange portion 21c of the cam plate 21 and the outer race 33 of the thrust bearing 31, and compressed in the direction of the rotational axis line A1. The preload spring 17 at least partially overlaps with the rollers 22, in the direction of the rotational axis line A1.

The rotary assembly 30 is placed to be displaceable in the direction of the rotational axis line A1 with respect to the thrust bearing 31. A gap G is formed between the rotary assembly 30 and the thrust bearing 31, in the direction of the rotational axis line A1. In the present embodiment, the gap G is formed between a back surface 21e of the cam plate 21 (surface opposite to the input disc 13) and the outer race 33 of the thrust bearing 31, in the direction of the rotational axis line A1.

The outer race 33 includes a spring contact portion 33a which contacts the preload spring 17, and a stopper portion 33b provided at a location that is deviated from the spring contact portion 33a in the radial direction. The stopper portion 33b faces the annular plate portion 21a of the cam plate 21 in the direction of the rotational axis line A1, with the gap G between the stopper portion 33b and the annular plate portion 21a. The stopper portion 33b is disposed radially outward of the spring contact portion 33a. The spring contact portion 33a is internally fitted to the tubular portion 21b of the cam plate 21. The stopper portion 33b protrudes radially outward from the outer portion of the spring contact portion 33a in the direction of the rotational axis line A1.

In the present embodiment, the outer race 33 includes a ring portion 33c supporting the rolling elements 34 from a radially outer side. The spring contact portion 33a protrudes radially inward from an end portion of the ring portion 33c, the end portion being closer to the preload spring 17. The stopper portion 33b protrudes radially outward from the ring portion 33c, at a location that is more distant from the preload spring 17 than the spring contact portion 33a in the direction of the rotational axis line A1. In the example of FIG. 3, the stopper portion 33b is provided at an end portion of the ring portion 33c, the end portion being on a side opposite to the spring contact portion 33a. However, the stopper portion 33b may not be provided at the end portion of the ring portion 33c so long as the gap G is formed between the stopper portion 33b and the cam plate 21.

In a state in which the rotary assembly 30 is not rotating, a dimension of the gap G in the direction of the rotational axis line A1 is less than a deformation amount of the preload spring 17 in the direction of the rotational axis line A, at an elastic limit. Therefore, when the rotary assembly 30 rotates and the output disc 14 and the cam plate 21 start to be relatively displaced in the direction of the rotational axis line A1 so that the output disc 14 and the cam plate 21 become away from each other, by the cam action of the pressing device 20, the cam plate 21 contacts the stopper portion 33b and the gap G ceases to exist, in a state in which the preload spring 17 is within an elastic deformation range. After the cam plate 21 has contacted the stopper portion 33b, the pressing force applied to the output disc 14 by the cam action of the pressing device 20 is increased, with an increase in the rotation speed of the rotary assembly 30.

In accordance with the above-described configuration, the thrust bearing 31 disposed between the transmission output shaft 12 and the preload spring 17 also serves as a stopper which limits the deformation of the preload spring 17 within the elastic deformation range to prevent plastic deformation of the preload spring 17. In a state in which the gap G formed between the rotary assembly 30 and the thrust bearing 31 is maintained, the thrust bearing 31 is retained between the nut 35 of the transmission output shaft 12 and the preload spring 17. Therefore, the thrust bearing 31 is held without an allowance. This makes it possible to reduce the number of members and extend the life of the thrust bearing 31 while preventing permanent deformation or the like of the preload spring 17.

In the thrust bearing 31, the spring contact portion 33a and the stopper portion 33b are provided at the locations that are deviated from each other in the radial direction. It is sufficient that the size of the thrust bearing 31 is increased in the radial direction, to obtain the above-described effects. Therefore, the configuration can be simplified. In particular, the stopper portion 33b is disposed radially outward of the spring contact portion 33a, and the gap G formed between the rotary assembly 30 and the thrust bearing 31 is located radially outward of the preload spring 17. Therefore, in a state in which the preload spring 17 is mounted, the gap G can be easily seen from outside. As a result, it becomes easier to manage the gap G.

Although in the above-described embodiment, the thrust bearing 31 is internally fitted to the cam plate 21, the thrust bearing may be provided at a location that is distant from the cam plate in the direction of the rotational axis line A1, on a side opposite to the output disc 14. In that case, the cam plate may be provided with a projection protruding in the direction of the rotational axis line A1 toward the thrust bearing so as to form a specified gap G between the cam plate and the stopper portion of the thrust bearing.

Embodiment 2

Figure 4:
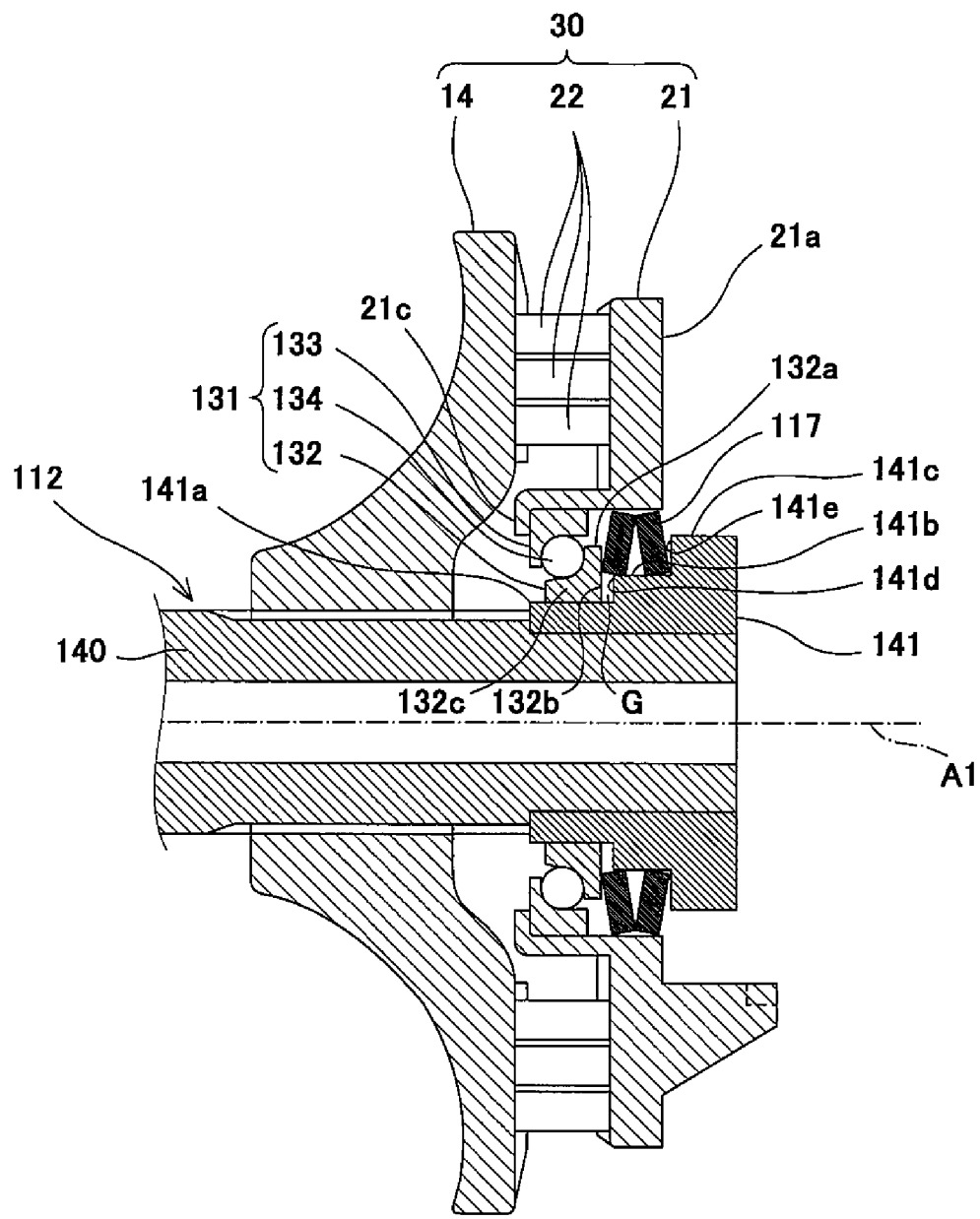
FIG. 4 is a view showing a toroidal CVT according to Embodiment 2, corresponding to FIG. 3.

FIG. 4 is a view showing a toroidal CVT according to Embodiment 2, corresponding to FIG. 3. In FIG. 4, the same constituents as those of Embodiment 1 are designated by the same reference symbols and will not be described in repetition. As shown in FIG. 4, a transmission output shaft 112 includes, for example, a shaft body 140, and an end sleeve 141 which is externally fitted and secured to the end portion of the shaft body 140. The end sleeve 141 includes a tubular portion 141a, a first protruding portion 141b protruding radially more outward than the tubular portion 141a at a location that is outward of the tubular portion 141a in the direction of the rotational axis line A1, and a second protruding portion 141c extending continuously with the outer side of the first protruding portion 141b in the direction of the rotational axis line A1 and protruding radially more outward than the first protruding portion 141b. An inner side surface 141d of the first protruding portion 141b which is on an inner side in the direction of the rotational axis line A1, and an inner side surface 141e of the second protruding portion 141c which is on an inner side in the direction of the rotational axis line A1 face the output disc 14. Specifically, the inner side surfaces 141d, 141e for positioning are formed in a step shape at the outer peripheral surface of the end portion of the transmission output shaft 112.

In a case where the transmission output shaft 112 has a peripheral surface with an outer diameter which can support a thrust bearing 131, it is not necessary to provide the tubular portion 141a at the end sleeve 141. The end sleeve 141 may not be separate from the transmission output shaft 112 and may be integrated with the transmission output shaft 112. In that case, the transmission output shaft 112 may include the first protruding portion 141b and the second protruding portion 141c.

A preload spring 117 is disposed between the transmission output shaft 112 and the thrust bearing 131 which will be described later. The preload spring 117 applies a preload to the rotary assembly 30 (specifically, the cam plate 21) in the direction of the rotational axis line A1 so that the rotary assembly 30 is pressed (pushed) toward the input disc 13. More specifically, the preload spring 117 is disposed between an inner race 132 of the thrust bearing 131 and the inner side surface 141e of the second protruding portion 141c of the transmission output shaft 112, and compressed in the direction of the rotational axis line A1. The preload spring 117 at least partially overlaps with the annular plate portion 21a of the cam plate 21, in the direction of the rotational axis line A1.

The thrust bearing 131 is disposed between the flange portion 21c of the cam plate 21 and the preload spring 117. The thrust bearing 131 at least partially overlaps with the rollers 22, in the direction of the rotational axis line A1. The thrust bearing 131 includes the inner race 132, an outer race 133, and rolling elements 134 disposed between the inner race 132 and the outer race 133. The outer race 133 faces the flange portion 21c of the cam plate 21 in the direction of the rotational axis line A1, and is in contact with the flange portion 21c of the cam plate 21. The inner race 132 includes a spring contact portion 132a which contacts the preload spring 117, and a stopper portion 132b provided at a location that is deviated from the spring contact portion 132a in the radial direction. The stopper portion 132b faces the inner side surface 141d of the first protruding portion 141b of the transmission output shaft 112, in the direction of the rotational axis line A1, with the gap G between the stopper portion 132b and the inner side surface 141d of the first protruding portion 141b. The stopper portion 132b is disposed radially inward of the spring contact portion 132a.

In the present embodiment, the inner race 132 includes a ring portion 132c supporting the rolling elements 134 from a radially inner side. The stopper portion 132b is provided at an end portion of the ring portion 132c, the end portion facing the inner side surface 141d of the first protruding portion 141b. The spring contact portion 132a protrudes radially outward from the stopper portion 132b. Although in the example of FIG. 4, a surface of the spring contact portion 132a, the surface facing the preload spring 17, and a surface of the stopper portion 132b, the surface facing the inner side surface 141d are coplanar with each other, they may not be coplanar with each other.

In a state in which the rotary assembly 30 is not rotating, a dimension of the gap G in the direction of the rotational axis line A1 is less than a deformation amount of the preload spring 117 in the direction of the rotational axis line A, at an elastic limit. Therefore, when the rotary assembly 30 rotates and the output disc 14 and the cam plate 21 start to be relatively displaced in the direction of the rotational axis line A1 so that the output disc 14 and the cam plate 21 become away from each other, by the cam action of the pressing device 20, the stopper portion 132b of the inner race 132 contacts the inner side surface 141d of the transmission output shaft 112 and the gap G ceases to exist, in a state in which the preload spring 117 is within an elastic deformation range. After the stopper portion 132b of the inner race 132 has contacted the inner side surface 141d of the transmission output shaft 112, the pressing force applied to the output disc 14 by the cam action of the pressing device 20 is increased, with an increase in the rotation speed of the rotary assembly 30.

In accordance with the above-described configuration, the thrust bearing 131 disposed between the cam plate 21 and the preload spring 117 also serves as a stopper which limits the deformation of the preload spring 117 within the elastic deformation range to prevent plastic deformation of the preload spring 117. In a state in which the gap G formed between the end sleeve 141 and the thrust bearing 131 is maintained, the thrust bearing 131 is retained between the cam plate 21 and the preload spring 117. Therefore, the thrust bearing 131 is held without an allowance. This makes it possible to reduce the number of members and extend the life of the thrust bearing 131 while preventing permanent deformation or the like of the preload spring 117. The other constituents are the same as those of Embodiment 1 and will not be described in repetition.

The present invention is not limited to the above-described embodiments. The configuration may be changed, added or deleted. The embodiments may be combined as desired. For example, a constituent (element) or method of one embodiment may be applied to another embodiment. A constituent of the embodiment may be separated from the other constituents of the embodiment and extracted. The rotary assembly may include other members rotatable together with the output disc 14 and the pressing device 20, in addition to the output disc 14 and the pressing device 20. The pressing device may be other than the pressing device of the loading cam type, and may be, for example, a pressing device of a centrifugal hydraulic type. Further, the pressing device may be constituted by the pressing device of the loading cam type and the pressing device of the centrifugal hydraulic type.

The invention claimed is:

1. A toroidal continuously variable transmission comprising:
a driving force transmission shaft;
a first disc disposed coaxially with the driving force transmission shaft;
a rotary assembly including a second disc facing the first disc, and a pressing device which presses the second disc toward the first disc, the rotary assembly being disposed coaxially with the driving force transmission shaft;
a power roller which is tiltably disposed between the first disc and the second disc;
a preload spring disposed between the pressing device and the driving force transmission shaft, the preload spring being configured to apply a preload to the rotary assembly in a direction of an axis line about which the driving force transmission shaft rotates so that the rotary assembly is pressed toward the first disc; and
a thrust bearing disposed between a first member and the preload spring, the first member being one of the rotary assembly and the driving force transmission shaft,
wherein in the direction of the axis line, a gap is formed between a second member and the thrust bearing, the second member being the other of the rotary assembly and the driving force transmission shaft, and
wherein a dimension of the gap in the direction of the axis line is less than a deformation amount of the preload spring in the direction of the axis line, at an elastic limit.

2. The toroidal continuously variable transmission according to claim 1,
wherein the thrust bearing includes a spring contact portion which contacts the preload spring, and a stopper portion provided at a location that is deviated from the spring contact portion in a radial direction, the stopper portion facing the second member in the direction of the axis line, with the gap between the stopper portion and the second member.

3. The toroidal continuously variable transmission according to claim 2,
wherein the stopper portion is disposed radially outward of the spring contact portion.

4. The toroidal continuously variable transmission according to claim 2,
wherein the second disc has a cam surface on a side opposite to the first disc, and
wherein the pressing device is a pressing device of a loading cam type, including a cam plate having a cam surface facing the cam surface of the second disc, and a roller sandwiched between the cam surface of the second disc and the cam surface of the cam plate.

5. The toroidal continuously variable transmission according to claim 3,
wherein the second disc has a cam surface on a side opposite to the first disc, and wherein the pressing device is a pressing device of a loading cam type, including a cam plate having a cam surface facing the cam surface of the second disc, and a roller sandwiched between the cam surface of the second disc and the cam surface of the cam plate.

6. The toroidal continuously variable transmission according to claim 3,
wherein the thrust bearing includes rolling elements and an outer race, and
wherein the outer race includes a ring portion supporting the rolling elements in the radial direction, the spring contact portion protruding radially inward from the ring portion, and the stopper portion protruding radially outward from the ring portion, at a location that is more distant from the preload spring than the spring contact portion in the direction of the axis line.

7. The toroidal continuously variable transmission according to claim 6,
wherein the second disc has a cam surface on a side opposite to the first disc, and
wherein the pressing device is a pressing device of a loading cam type, including a cam plate having a cam surface facing the cam surface of the second disc, and a roller sandwiched between the cam surface of the second disc and the cam surface of the cam plate.

8. The toroidal continuously variable transmission according to claim 1,
wherein the second disc has a cam surface on a side opposite to the first disc, and
wherein the pressing device is a pressing device of a loading cam type, including a cam plate having a cam surface facing the cam surface of the second disc, and a roller sandwiched between the cam surface of the second disc and the cam surface of the cam plate.

* * * * *